US011579116B2

(12) United States Patent
Seitz

(10) Patent No.: US 11,579,116 B2
(45) Date of Patent: Feb. 14, 2023

(54) CHIP-BASED MULTI-CHANNEL ELECTROCHEMICAL TRANSDUCER AND METHOD OF USE THEREOF

(71) Applicant: Peter Seitz, Urdorf (CH)

(72) Inventor: Peter Seitz, Urdorf (CH)

(73) Assignee: Peter Seitz, Urdorf (CH)

(*) Notice: Subject to any disclaimer, the term of this patent is extended or adjusted under 35 U.S.C. 154(b) by 433 days.

(21) Appl. No.: 16/620,745

(22) PCT Filed: May 30, 2018

(86) PCT No.: PCT/IB2018/053836
§ 371 (c)(1),
(2) Date: Dec. 9, 2019

(87) PCT Pub. No.: WO2018/229581
PCT Pub. Date: Dec. 20, 2018

(65) Prior Publication Data
US 2020/0182825 A1    Jun. 11, 2020

Related U.S. Application Data

(60) Provisional application No. 62/517,968, filed on Jun. 11, 2017.

(51) Int. Cl.
    G01N 27/416    (2006.01)
(52) U.S. Cl.
    CPC .................. G01N 27/416 (2013.01)
(58) Field of Classification Search
    CPC .................................................. G01N 27/416
    See application file for complete search history.

(56) References Cited

U.S. PATENT DOCUMENTS 4,222,815 A * 9/1980 Krechmery ........... G01L 1/2293
                                                         257/419
5,062,432 A   11/1991 James et al.
(Continued)

FOREIGN PATENT DOCUMENTS

CH        710704 A1      8/2016
CN      108542362 A      9/2018
(Continued)

OTHER PUBLICATIONS

Extended European Search Report for Application No. 18194729.2 dated Apr. 4, 2019, 8 pages.
(Continued)

Primary Examiner — Alesa Allgood
(74) Attorney, Agent, or Firm — Nathan & Associates; Menachem Nathan

(57) ABSTRACT

Embodiments relate to a monolithic arrangement comprising one or more electrochemically responsive electrodes that are configured to generate a signal relating to a characteristic of a fluid sample; and one or more electronic circuits for processing signals generated by the at least one electrode. Optionally, the monolithic arrangement comprises a plurality of electrodes configured to implement potentiostat and/or galvanostat measurement techniques. Optionally, at least two of the plurality of electrodes have different electrochemical material layers to obtain correspondingly different electrode functionalization.

20 Claims, 12 Drawing Sheets

(56) References Cited

U.S. PATENT DOCUMENTS

| | | | |
|---|---|---|---|
| 5,437,999 | A | 8/1995 | Kordal et al. |
| 2003/0100821 | A1 | 5/2003 | Heller et al. |
| 2004/0015058 | A1 | 1/2004 | Bax et al. |
| 2004/0072357 | A1 | 4/2004 | Allen et al. |
| 2005/0101872 | A1 | 5/2005 | Sattler et al. |
| 2005/0276309 | A1 | 12/2005 | Koch |
| 2006/0237313 | A1* | 10/2006 | Kiesele ............... G01N 27/404 204/412 |
| 2007/0055171 | A1 | 3/2007 | Fraden |
| 2007/0239038 | A1 | 10/2007 | Nicolaescu et al. |
| 2008/0119707 | A1 | 5/2008 | Stafford et al. |
| 2009/0227887 | A1* | 9/2009 | Howard ............... A61B 5/0833 600/531 |
| 2009/0296773 | A1 | 12/2009 | Sattler |
| 2009/0306536 | A1 | 12/2009 | Ranganathan et al. |
| 2010/0179403 | A1 | 7/2010 | Fosse et al. |
| 2010/0276734 | A1* | 11/2010 | Josowicz ........... G01N 27/3277 257/253 |
| 2011/0051776 | A1 | 3/2011 | Bieberich et al. |
| 2011/0053289 | A1* | 3/2011 | Lowe ............... B01L 3/502769 436/501 |
| 2011/0158284 | A1 | 6/2011 | Goto |
| 2012/0088993 | A1 | 4/2012 | Buck et al. |
| 2012/0128024 | A1 | 5/2012 | Tsuchida et al. |
| 2013/0085708 | A1 | 4/2013 | Sattler |
| 2013/0220836 | A1* | 8/2013 | Kermani ............ G01N 27/3274 204/403.01 |
| 2013/0332085 | A1* | 12/2013 | Yang .................... G01N 27/416 702/22 |
| 2016/0081562 | A1 | 3/2016 | Lachhman |
| 2016/0146754 | A1 | 5/2016 | Prasad et al. |
| 2016/0256070 | A1 | 9/2016 | Aranyosi et al. |
| 2017/0000390 | A1 | 1/2017 | Biederman et al. |
| 2017/0100035 | A1 | 4/2017 | Amfahr et al. |
| 2018/0028072 | A1 | 2/2018 | Shi |
| 2018/0049646 | A1 | 2/2018 | Ellis et al. |
| 2018/0184908 | A1 | 7/2018 | Meyerson et al. |
| 2019/0183394 | A1 | 6/2019 | Beech et al. |
| 2020/0359909 | A1 | 11/2020 | Kraiter et al. |

FOREIGN PATENT DOCUMENTS

| | | |
|---|---|---|
| CN | 211237738 U | 8/2020 |
| DE | 10038247 A1 | 5/2001 |
| DE | 10038247 C2 | 12/2002 |
| DE | 10139705 A1 | 4/2003 |
| DE | 102005037921 B3 | 6/2006 |
| DE | 102007002369 B3 | 5/2008 |
| DE | 102007025806 B3 | 6/2008 |
| DE | 102013005900 A1 | 10/2014 |
| DE | 102015206938 A1 | 10/2016 |
| DE | 102016212948 A1 | 8/2017 |
| EP | 2251660 | 11/2010 |
| EP | 2551660 A2 | 1/2013 |
| GB | 2422907 A | 8/2006 |
| KR | 20080030376 | 4/2008 |
| WO | 2008078271 A1 | 7/2008 |
| WO | 2010023255 A1 | 3/2010 |
| WO | 2010045247 | 4/2010 |
| WO | 2016030869 | 3/2016 |
| WO | 2017031129 A1 | 2/2017 |
| WO | 2017094016 A1 | 6/2017 |
| WO | 2017108964 A1 | 6/2017 |
| WO | 2017109464 | 6/2017 |
| WO | 2017157746 A1 | 9/2017 |
| WO | 2017181195 A1 | 10/2017 |
| WO | 2017214775 A1 | 12/2017 |
| WO | 2017216056 A1 | 12/2017 |
| WO | 2018026931 A1 | 2/2018 |
| WO | 2018033799 A1 | 2/2018 |
| WO | 2018114653 A1 | 6/2018 |
| WO | 2019133469 A1 | 7/2019 |
| WO | 2019230392 A1 | 12/2019 |

OTHER PUBLICATIONS

"Extended European Search Report dated Apr. 4, 2019 in EP18194729.2".

F. E. Harris et al: "Determination of Traces of Water Vapor in Gases", Analytical Chemistry, vol. 23, No. 5, May 1951 (May 1951), pp. 736-739, XP055574460, ISSN: 0003-2700, DOI: 10.1021/ac60053a015.

International Preliminary Report on Patentability for Application No. PCT/IB2018/053836, dated Dec. 17, 2019, 7 pages.

International Search Report and Written Opinion for Application No. PCT/EP2019/074784, dated Oct. 2, 2019, 11 pages.

Kulkarni A et al: "Fabrication and characterization of innovative gas flow sensor" Sensors and Actuators A: Physical. Elsevier BV, NL, vol. 122, No. 2, Aug. 26, 2005 (Aug. 26, 2005). pp. 231-234, XP027807131. ISSN: 0924-4247.

Utility of the Ava Bracelet to Diagnose and Monitor Symptoms Potentially Related to COVID-1 | https://www.avawomen.com/ava-bracelet-for-covid-19 | Mar. 20, 2020 | Ava _ Science Inc.

X. Li et al., "Digital Health: TrackingPhysiomes and Activity Using Wearable Biosensors Reveals Useful Health-RelatedInformation", PLOS Biology, Jan. 12, 2017.

Xiao Li et al: | Digital Health: Tracking Physiomes and Activity Using Wearable Biosensors Reveals Useful Health-Related Information | PLOS Biology | DOI:10.1371/journal.pbio.2001402 Jan. 12, 2017.

Zeyi Zhou et al: "Determination micro-traces of water in gases hydrogen gas sensor combined conversion reactor column; of micro-traces of water in hydrogen gas sensor combined conversion reactor column". Measurement Science and Technology, IOP, Bristol, GB, vol. 15. No. 10, Sep. 15, 2004 (Sep. 15, 2004), pp. 2170-2174. XP020066399, ISSN: 0957-0233. DOI: 10.1088/0957-0233/15/10/030.

International Search Report and Written Opinion for Application No. PCT/IB2021/058087, dated Dec. 23, 2021, 14 pages.

Rothe J. et al: "Multi-target electrochemical biosensing enabled by integrated CMOS electronics; Multi-target electrochemical biosensing enabled by integrated CMOS electronics", Journal of Micromechanics & Microengineering, Institute of Physics Publishing, Bristol, GB, vol. 21, No. 5, Apr. 28, 2011.

Frey A. et al: A Fully Electronic DNA Sensor With 128 Positions and In-Pixel A/D Conversion , IEEE Journal of Solid-State Circuits, IEEE Service Center, Piscataway, NJ, USA, vol. 39, No. 12, Dec. 1, 2004.

Tomoyuki Yamazaki et al: "An electrochemical array sensor with CMOS signal processing circuits integrated on a single chip",Biomedical Circuits and Systems Conference (BIOCAS). 2010 IEEE, IEEE, Nov. 3, 2010.

Rita Maalouf et al.: "Label-Free Detection of Bacteria by Electrochemical Impedance Spectroscopy: Comparison to Surface Plasmon Resonance", Anal.Chem.2007, 79, 4879-4886.

International Search Report of PCT/IB2018/053836 dated Aug. 29, 2018.

Written Opinion of the International Searching Authority dated Aug. 29, 2018.

Information on Search Strategy of PCT/IB2018/053836, dated Aug. 29, 2018.

Munoz-Martinez et al: "Electrochemical Instrumentation of an Embedded Potentiostat System (EPS) for a Programmable-System-On-a-Chip", Article in Sensors, Published Dec. 2018, MDIP.

Daniel Rose et al: "Adhesive RFID Sensor Patch for Monitoring of Sweat Electrolytes", IEEE Transactions on Biomedical Engineering; vol. 62, 1457-1465, Issue: 6 , Jun. 2015.

Hsu et al: "Epidermal electronics: Skin sweat patch", 2012 7th International Microsystems, Packaging, Assembly and Circuits Technology Conference (IMPACT).

Philips: "Sweat-Patch Test for Alcohol Consumption: Rapid Assay with an Electrochemical Detector", Sep. 1982.

Dam et al: "Toward wearable patch for sweat analysis", Sensors and Actuators B: Chemical, vol. 236, Nov. 29, 2016, pp. 834-838.

Jia et al: "Electrochemical Tattoo Biosensors for Real-Time Noninvasive Lactate Monitoring in Human Perspiration", Anal. Chem. 2013, 85, 14, 6553-6560, Publication Date:Jul. 1, 2013.

(56) References Cited

OTHER PUBLICATIONS

Bandodkar et al: "Non-invasive wearable electrochemical sensors: a review", Trends in Biotechnology, vol. 32, Issue 7, Jul. 2014, pp. 363-371.
Crew et al: "Development of a novel electrochemical immuno-assay using a screen printed electrode for the determination of secretory immunoglobulin A in human sweat", Electrochimica Acta, vol. 52, Issue 16, Apr. 30, 2007, pp. 5232-5237.
International Preliminary Report on Patentability for PCT/IB2018/053836, dated Dec. 17, 2019.
Chinese Patent Application No. 201880038463.3, Office Action dated Sep. 18, 2021.
European Office Action for Application No. 19766268.7, dated Dec. 13, 2021, 5 pages.
International Search Report and Written Opinion for Application No. PCT/IB2021/051413, dated May 7, 2021, 12 pages.
"Lees, Kim and Macnamara, "Non-Invasive Determination of Core Temperature During Anesthesia", South Med J. Oct. 1980;73(10):1322-4. doi: 10.1097/00007611-198010000-00010.".
Chinese Patent Application No. 201880038463.3, Office Action dated Jun. 16, 2022—English Translation Available.
Rothe, Joerg, et al. "Fully integrated CMOS microsystem for electrochemical measurements on 32x 32 working electrodes at 90 frames per second " Analytical chemistry 86.13 (2014): 6425-6432.
Hammond, Paul A., Danish Ali, and David RS Cumming. "A system-on-chip pH meter for use in a wireless diagnostic capsule." IEEE Transactions on Biomedical Engineering 52.4 (2005): 687-694.
Tang, Kea-Tiong, et al. "A Wearable electronic nose soc for healthier living." 2011 IEEE Biomedical Circuits and Systems Conference (BioCAS). IEEE, 2011.
Office Action in related EP patent application 18731189.9, dated Dec. 7, 2022.

\* cited by examiner

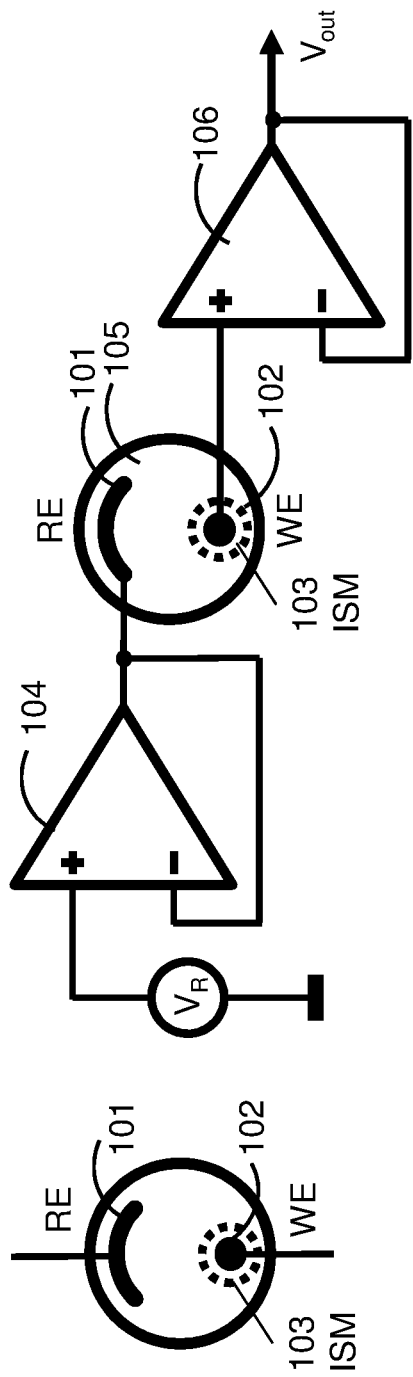

CHIP-BASED MULTI-CHANNEL ELECTROCHEMICAL TRANSDUCER AND METHOD OF USE THEREOF

CROSS-REFERENCE TO RELATED APPLICATIONS

This application is a 371 National Phase application from international application PCT/IB2018/053836 filed May 30, 2018, which claims priority from U.S. Provisional Patent Application No. 62/517,968 filed on Jun. 11, 2017, titled "CHIP-BASED MULTI-CHANNEL TRANSDUCER AND ANALYSIS SYSTEM" and which is expressly incorporated herein by reference in its entirety.

TECHNICAL FIELD

The present disclosure relates to concurrent concentration measurement of a multitude of chemical target analytes such as ions, atoms and/or molecules in a fluid sample.

BACKGROUND

Chemical analysis of fluid or humid materials is a common problem for which a large number of investigation techniques exist. Electrochemical methods are of particular simplicity and ease of use. Electrochemical techniques encompass a class of analytical chemistry methods which measure the concentration of a chemical analyte by measuring the electric potential and/or the electrical current in an electrochemical cell in which the analyte is present in a fluid sample. In practice, the two main electrochemical categories are potentiometry and galvanometry (also called amperometry or voltammetry).

Potentiometry is implemented with a so-called potentiostat, measuring the voltage difference between a working electrode (also: WE) and a reference electrode (also: RE) in a two-electrode electrochemical cell. Potentiometry is used to measure the concentration of ions (charged atoms or molecules) in a fluid sample.

Galvanometry is implemented with a so-called galvanostat, measuring the current between a counter-electrode and a working electrode, while controlling the electrical potential between the reference and the working electrode in a three-electrode electrochemical cell. Galvanometry is used to measure the concentration of uncharged analytes in a liquid sample, by converting an analyte from one oxidation state into another. By measuring the number of electrons transferred in this redox reaction, the concentration of the analyte in the sample can be determined.

References which may be considered to be relevant as background to the presently disclosed subject matter are listed below:

International patent application WO2016/070083, "Multichannel Potentiostat Analyzer System and Method" to L. I. Baichen discloses (Abstract):

"The present disclosure outlines a device having a multi-channel potentiostat circuit and a microcontroller for controlling the multi-channel potentiostat circuit. The multi-channel potentiostat circuit includes a counter electrode, a reference electrode, and a first switch between the counter electrode and the reference electrode. The multi-channel potentiostat circuit also includes a plurality of measurement circuits coupled to respective second switches. The microcontroller can configured [sic!] to provide a first signal to the multi-channel potentiostat circuit to control the first switch, wherein a state of the first switch changes an operating mode of the multi-channel potentiostat circuit. The microcontroller is also configured to provide a second signal to the multi-channel potentiostat circuit to control at least one of the second switches to couple at least one of the plurality of measurement circuits to a working electrode."

European patent application EP2980577 titled "Electrochemical Sensor System and Sensing Method" to Marshall, discloses (Abstract):

"A sensor system for assessing a target species in a liquid medium is disclosed. The sensor system includes a sensor element which is inserted a sample of liquid medium to be tested. The sensor element has three or more electrodes and receives a predetermined potential from a potentiostat. This potential is determined as the potential associated with an electrochemical reaction characteristic in the liquid medium of a target species. The sensor system also includes an output to display data corresponding to the current passing through the liquid medium which is indicative of the concentration of the target species and resulting from the electrochemical reaction which occurs."

European patent application US4670127 titled "Ion-sensitive membrane electrode" to Ritter et al. discloses (Abstract):

"In order to produce a sensitive membrane electrode with high selectivity with respect to other anions and lipophilic ions or interfering substances, the membrane is based on an unplasticized polymer matrix whose content of electroactive component is between 50 and 90 percent by weight."

Maalouf et al. disclose in "Label-Free Detection of Bacteria by Elecrochemical Impedance Spetroscopy: Comparison to Surface Plasmon Resonance", Anal. Chem. 2007, 79, 4879-4886: (Conclusion):

"The present study has demonstrated the successful deposition of mixed SAMs of biotin-thiol and OH-thiol on a gold electrode, enabling the subsequent immobilization of biotinylated anti-E. coli via a strong biotin—neutravidin interaction."

Acknowledgement of the above references herein is not to be inferred as meaning that these are in any way relevant to the patentability of the presently disclosed subject matter.

Moreover, the description above is presented as a general overview of related art in this field and should not be construed as an admission that any of the information it contains constitutes prior art against the present patent application.

BRIEF DESCRIPTION OF THE FIGURES

The figures illustrate generally, by way of example, but not by way of limitation, various embodiments discussed in the present document.

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. References to previously presented elements are implied without necessarily further citing the drawing or description in which they appear. The number of elements shown in the Figures should by no means be construed as limiting and is for illustrative purposes only. The figures are listed below.

FIG. 1A is a schematic illustration of an electrochemical cell for potentiostat-based electrochemical analysis, according to some embodiments;

FIG. 1B is a schematic illustration of an electronic circuit suitable for performing potentiostat-based electrochemical analysis, according to some embodiments;

DETAILED DESCRIPTION

Figures 2A, 2B:
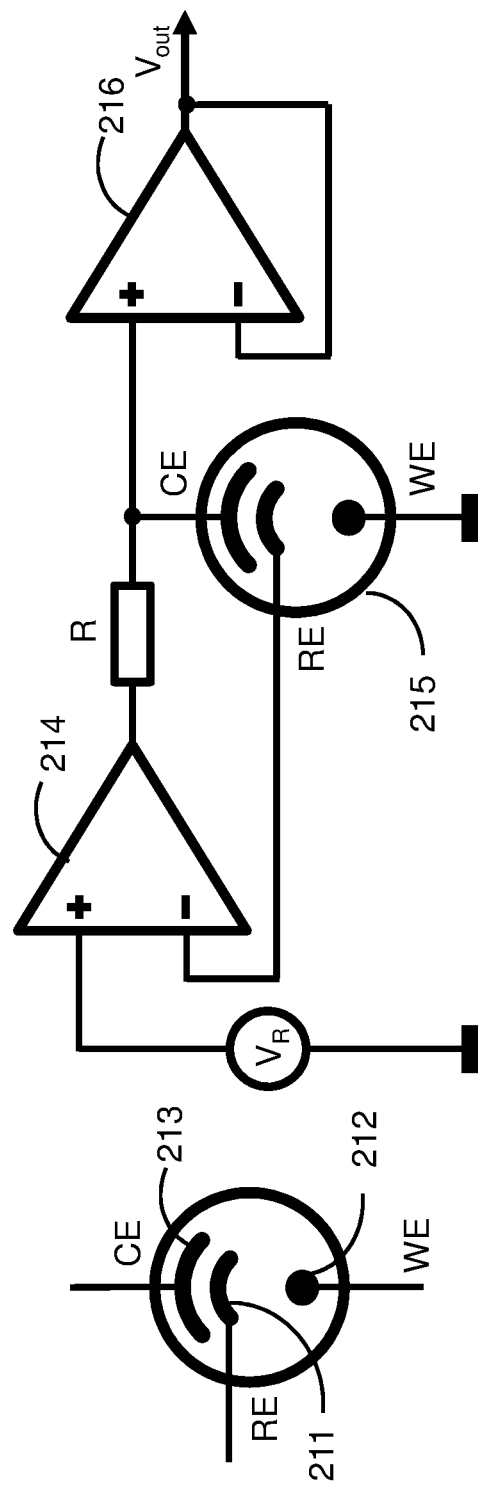
FIG. 2A is a schematic illustration of a three-electrode based electrochemical cell suitable for galvanostat-based electrochemical analysis, according to some embodiments.
FIG. 2B is a schematic illustration of an electronic circuit diagram suitable for performing galvanostat-based electrochemical analysis, according to the background art.

Aspects of disclosed embodiments relate to concurrent measurement of properties (also: characteristics) pertaining to a fluid solution such as, for example, a concentration level of one or more chemical target analytes including, for instance, ions (e.g., for pH measurement), atoms (e.g., heavy metal atoms) and/or molecules (e.g., uncharged molecules) in a fluid sample using a chip-based (e.g., single chip-based) multichannel electrochemical transducer and, methods of use thereof. Analytes (also: target analytes) can include, for example, one of the following: hydrogen ions (defining pH); glucose; lactate; magnesium; calcium; chloride; potassium chloride; sodium chloride; sodium; phosphate; lead; potassium; cortisol; calcium; any amino acids; uric acid; ethanol; creatinine; hydrogen peroxide; cytokines and/or hormones.

The term "property" as used herein can refer to intrinsic as well as to extrinsic properties of fluid samples being monitored. An analyte concentration level for instance may be considered to be an extrinsic property, as said property may depend on a variety of environmental factors, while the atomic weight of an element may be considered to be an intrinsic property of that element.

The term "fluid" may refer to any substance that can flow such as liquids, gas and/or air.

A chip-based multichannel transducer may herein be referred to as multi-channel integrated-circuit or IC-based electrochemical (MTIC) transducer that comprises one or more electrochemically responsive electrodes. A plurality of electrodes of an MTIC transducer may herein be referred to as an "electrode arrangement".

In an embodiment, a monolithic chip structure (also: monolithic arrangement) comprises one or more MTIC transducers. In other words, the one or more MTIC transducers are fabricated on a single wafer. In an embodiment, the monolithic chip structure comprise semiconductor material.

In some embodiments, the monolithic arrangement comprises at least one electrode and at least one electronic circuit for implementing the MTIC transducer. Optionally, the electrodes are part of the electronic circuit. In an embodiment, the at least one electrode is configured to be electrochemically responsive. Such electrode exhibits electrochemical sensing capabilities and may, when in contact with a fluid sample, generate electronic signals relating to one or more characteristics of the fluid sample. For example, the MTIC transducer may comprise a plurality of electrodes for implementing, for example, potentiometry and/or galvanometry measurements.

The same monolithic arrangement comprising the at least one electrochemically responsive electrode may further comprise the electronic circuit for processing signals generated by terminals of the electrodes. The electronic circuit may, for example, A/D and/or signal amplification circuitry.

Electrodes of the MTIC transducer may comprise electrochemically responsive terminals and conductive links that extend from the sensing terminal of the electrode to the electronic circuit of the monolithic arrangement. Optionally, the monolithic arrangement may comprise a sensing terminal of an electrode. Signals generated at and/or by the sensing terminals of the electrodes are transmitted by the conductive links to the signal processing circuit of the MTIC transducer.

While the conductive links can be considered to be part of the electronic circuit comprised by the monolithic arrangement, the discussion herein may, merely for the sake of clarity and without be construed in a limiting manner, distinguish between the conductive links of the electrodes and the electronic circuit.

The same monolithic arrangement may thus incorporate (also: comprise or embed) at least one electrochemically responsive electrode that comprises an electrode terminal that is operably coupled, through electrically conductive links (e.g., conductive traces) embedded by the monolithic arrangement, with an electronic signal processing circuit of the same monolithic arrangement for implementing the MTIC transducer. Optionally, a conductive link of an electrode may be considered to comprise the electrode terminals.

In some embodiments, the MTIC transducer may be configured to implement at least two different transduction modes (also: modalities).

An electronic signal processing circuit of the MTIC transducer may be operable to implement analog, digital and/or pre-processing of signals. Accordingly, electrochemical sensing and related processing can be performed by components which are located "at the same site" as the electrode terminals, i.e., not remote from the terminals so that for example the length of the conductive links communicably coupling an electrode terminal with electronic circuitry does not exceed, for instance, 100 micrometers. The comparatively short distances between the electrode terminals generating signals, and the electronic circuit receiving signals generated by the terminals may even eliminate inadvertent stray signal pickup and/or generation of leakage current.

In some embodiments, the MTIC transducer may be configured to output analog and/or digital signals relating to a property of a fluid. Optionally, fluid-property related signal outputs provided by the MTIC transducer are exclusively of the type of digital signals.

Due to the comparatively short length of the conductive links carrying an analog electrode signal, and/or due to the MTIC transducer providing, based on the analog signals, digital output signals, the signals output by the MTIC transducer are comparatively robust to, for example, unintentional electrical interference (e.g., generated by 50/100 or 60/120 Hz mains electricity; high-frequency interference from WiFi emitters or RF electronics nearby, and/or the like).

Furthermore, by employing on-chip A/D conversion of analog electrode signals, the same digital output line may carry information relating to a plurality of analog electrode signal outputs using, for example, signal multiplexing techniques.

In some embodiments, the monolithic arrangement comprising an MTIC transducer may additionally incorporate an analysis module that is operable to analyze output signals transmitted by the conductive links of the electrochemically responsive electrodes. Hence, according to some embodiments, the same monolithic arrangement may comprise a multi-channel electrochemical analysis system that comprises an MTIC transducer and an analysis module. Optionally, the analysis module may be external to the MTIC transducer.

Although embodiments disclosed herein refers to "multi-channel" implementations, this should by no means be construed in a limiting manner. In some embodiments, the MTIC transducer may be configured to implement only a single channel of analyte-related signal output.

Optionally, the single chip employing and/or incorporating the MTIC transducer may be manufactured by various semiconductor fabrication methods which can include, for example, complementary metal-oxide semiconductor (CMOS) manufacturing technology. In some embodiments, the single chip may be configured to implement analog-to-digital (A/D) signal technologies. Optionally, the analog signals relating to the measurements of fluid properties may be converted into digital signals and then amplified by additional circuitry of the MTIC transducer.

While examples discussed herein refer to potentiostat and/or galvanostat implementations, this should by no means be construed in a limiting manner. An MTIC transducer may, for example, employ analysis channels that are based on electrochemiluminescene, photoelectrochemistry, magnetoelectrochemistry and/or photo-sensitive technologies.

Embodiments of MTIC transductors may employ additional types of sensors including, for example, photosensors, spectrometers (multi-spectral sensors), thermal sensors, magnetometers (Hall sensors), conductivity sensors, capacitive sensors, accelerometers and/or acoustic sensors (microphones).

Any of the above noted sensor types may be combined with appropriate chemical transduction principles. As an example, a multi-spectral (also: electrical impedance spectroscopy or EIS-implementing) sensor can be coated with an indicator chemical compound undergoing a color change as a function of the analyte concentration. In this way, the same channel may provide, concurrently, different output modalities. Different output modalities, whether implemented on the same channel or by different channels, may be implemented by the MTIC transducer for obtaining data pertaining to the same fluid solution properties (e.g., concentration of the same analyte); for obtaining data pertaining to different fluid solution properties (e.g., a first output modality may be employed for determining the concentration of a first analyte, and a second output modality may be employed for determining the concentration of a second analyte); and/or at least two different output modalities may be employed, e.g., one for quantitative and one for qualitative analysis.

The MTIC transducer may thus, in some embodiments, be configured to comprise multi-channel and multi-modal for realizing, for example, with the aim of verifying measurements through complementary analysis methods and/or to perform data fusion.

In some embodiments, the concentration of two or more analytes may be measured using the same analysis channel by sequentially subjecting electrodes of the electrode arrangement of an MTIC transducer to at least two different voltages and/or voltage differences. For instance, as briefly mentioned herein above, electrical impedance spectroscopy (EIS) may be applied. In EIS, the frequency of an electrical stimulus may be changed over time, and the transducer response as a function of the frequency is observed. In this way, it is possible to measure the concentration of one analyte and also allows distinguishing between the concentration levels of several analytes in the same sample.

Optionally, EIS may employ measuring impedance of the electrochemical cell responsive to a change in frequency of a biasing voltage. The frequency may for example range from 100 mHz to 100 kHz. Observed properties of the frequency-dependent impedance curves can then be used to extract information about the concentration of an analyte and possibly also about the presence of several analytes for the same sample. EIS thus makes use of frequency-dependent voltage and current measurements.

It is noted that the terms "production", "manufacturing" and "fabrication" as well as grammatical variations thereof may herein be used interchangeably.

In some embodiments, the MTIC transducer comprises a comparatively reduced number of output connections compared to known electrochemical analysis systems. The same output connection may be employed for reading out output data provided by different analysis channels of the MTIC transducer.

Optionally, the output provided by the output connections of the MTIC transducer may be comparatively immune against potentially undesired signal-pickup from the environment, to electromagnetic coupling, and/or leakage current generation. Optionally, the output connections may provide only signals that encode data digitally.

In some embodiments, the number of external connections may be independent of the number of analysis channels of the MTIC transducer. For instance, time division or other multiplexing techniques may be employed to readout signals output by the external connections.

In some embodiments, a multi-channel electrochemical transducer and analysis (MTA) system comprising an MTIC transducer may comprise a non-volatile memory. In this way, the MTA system can store data descriptive of information about its manufacturing process, sensitizing coating on or material of which each working electrode may be made of, calibration procedures, as well as about the history of the measurements carried out with the MTIC transducer. Material that may be employed in sensitizing coating applications may include, for example, Polyvinyl Chloride (PVC), methyl-tri-caprylcyl-ammonium chloride, methyl-tri-dodecyl-ammonium chloride, and/or the like. In some embodiments, the MTIC transducer may have a planar configuration. Optionally, the analysis channels of the MTIC transducer may be in planar configuration relative to each other. Such planar configuration may, for example, allow comparatively easy and cost-effective operable coupling of the MTA system with a microfluidic carrier system. Optionally, the MTIC transducer may for example be relatively easily operably integrated with a variety of devices including, for example, a disposable measurement cartridge, a measurement module and/or a wearable patch. Optionally, a device may comprise a plurality of MTIC transducer. Components of the MTA system may be manufactured by employing, for example, CMOS manufacturing technology.

In some embodiments, the MTIC transducer comprises an electrochemical cell which may exhibit comparatively internal resistance of, for example, up to 1 GOhm while, at the same time, ensuring comparatively low susceptibility to interference.

Embodiments of the MTIC transducer configurations may render the transducer less susceptible to leakage current. Optionally, embodiments of the MTIC transducer configurations meet the regulation requirements pertaining to electromagnetic compatibility. Optionally, despite that the potential differences in a potentiostat measurements may have to be measured with sub-mV accuracy, and despite that the currents in a galvanostat may have to be measured with sub-nA accuracy, and substrate for electrical links of the MTIC transducer may have comparatively lower dielectric resistance, and electrical shielding requirements of guard-electrodes may be reduced. Finally, the MTIC transducer may comprise buffer amplifiers having reduced input impedance ranging, for example, from 10 MOhm to 100 GOhm.

In some embodiments, a plurality of electrode terminals made of electrically conductive material may be provided on the chip's substrate. These electrode terminals can serve as reference electrode, counter-electrode and working electrodes. In order to give these electrode terminals the required properties for an electrochemical analysis system in terms of sensitivity, selectivity and/or stability, the different electrodes terminals may be coated with and/or comprise suitable materials.

For example, a counter-electrode terminal of an electrochemical cell may for example be made of a chemically inert material such as, for instance, Pt, Au, or graphite, e.g., if the counter-electrode is not supposed to contribute to electrochemical reactions of chemical target analytes.

The reference electrode may be employed as a stable node in the measurement circuit exhibiting a well-known, unchanging electric potential. For proper electrochemical measurement, the current through the reference electrode may have to be kept as closely as possible to zero.

In some embodiments, the electrode terminals are operably connected via signal lines with analog electronic circuits formed in and/or on the chip to implement, for example, electronic functionalities required for a multi-channel potentiostat and/or galvanostat.

Optionally, analog signals input into the analog electronic circuits are converted into digital signals under the control of an embedded microprocessor core. The microprocessor core may have access to on-chip memory (e.g., Programmable Read-Only Memory or PROM) and Random Access Memory or RAM). The on-chip memory may be operative to store data descriptive of, for example, specifics of the chip's manufacturing and data log history. The microprocessor may execute instructions stored in the memory resulting in a communication driver application that is operable to execute protocols for the transmission of data, e.g., to the Internet, an Intranet, a Wide Area Network (WAN), a Local Area Network (LAN) employing, e.g., Wireless Local Area Network (WLAN)), Metropolitan Area Network (MAN), Personal Area Network (PAN), extranet, 2G, 3G, 3.5G, 4G including for example Mobile WIMAX or Long Term Evolution (LTE) advanced, 5G, Bluetooth® (e.g., Bluetooth smart), ZigBee™, near-field communication (NFC) and/or any other current or future communication network, standard, and/or system.

In some embodiments, the processing of the analog signals output by the analog electronic circuits may be implemented "off-chip", i.e., by a processor and memory that are external to the chip. In one example implementation, each (buffered) output analog signal may be provided to off-chip electronics so that the number of signal lines for readout of the analog signals corresponds to the number of analyte channels. In another example implementation of the "off-chip" processing of analog signals, the integrated circuit implementing the MTIC transducer may comprise a channel-selection circuit (not shown). The analog channel-selection circuit allows selectively outputting analog signals provided by a plurality of analysis channels via the same output line for further off-chip processing of the read-out analog signal.

Aspects of embodiments further pertain to a method of using the MTIC transducer and/or the MTA system for measuring a parameter value pertaining to target analyte of a fluid sample. Such method may include responsively coupling (for example, operably engaging such as directly or indirectly, e.g., via fluid channels) the one or more MTIC transducers with a sensing site (e.g., a vertebrate's skin such as the human skin or any other organ tissue of a subject (also: user)), and processing electronic signals generated by the one or more MTIC transducers to determine parameter values relating to one or more target analytes of a fluid sample (e.g., analyte concentration in the fluid sample) that is present on and, optionally, flowing on the sensing site. For example, the MTIC transducer may be employed in operative conjunction with a user to determine parameter values relating to one or more target analytes (e.g., for determining a characteristic of a fluid sample or of a change thereof) of bodily fluid that may be discharged (e.g., excreted or secreted) by the user. Bodily fluid may include for example, sweat, saliva and/or tears. The MTIC transducer may for example be engaged (e.g., directly or indirectly via, e.g., fluid channels) with the user's skin (e.g., the epidermis) for measuring the concentration of one or more target analytes of bodily fluid discharged by the user. Operably engaging the MTIC transducer with the user can include operably engaging electrode terminals of the MTIC transducer with organ tissue (e.g., skin) of the user so that the electrode terminals can make contact with bodily fluids discharged by the user's organ tissue.

By determining a characteristic of the fluid through measurement of, e.g., concentration of one or more target analytes, information may be derived enabling one to diagnose ailments, health status, toxins, performance, and other physiological attributes (e.g., lactate electrochemical sensing for muscle fatigue) of the user, even in advance of any physical sign. For example, the action of sweating, and other parameters, attributes, solutes, and/or features on, near, and/or beneath the user's skin can be measured to further reveal physiological information. The MTIC transducer and related systems and methods may be applied in pre-chronic disease detection and/or follow-up medical care, to name only a few examples.

In some embodiments, the MTIC transducer may be a component of a medical device such as a medical implant. Optionally, the MTIC transducer may be implantable in the user's body.

The user may be a patient, a medical professional, a person engaging in sports activities; a person working in hazardous environments; a traffic participant (e.g., a driver, a pedestrian); a person engaging in law enforcement or other psychologically stressful and/or physically strenuous activities; and/or a person that is working in prolonged static postures in any of the configurations such as, for example, sitting and standing; and/or the like.

Embodiments of disclosed MTIC transducers may implement a potentiostat e.g., as outlined with respect to FIGS. 1A and 1B. FIG. 1A schematically illustrates a two-electrodes electrochemical cell 105 for carrying out potentiometric measurements; and FIG. 1B schematically illustrates an electronic circuit diagram for carrying out a potentiometric. A reference electrode (also: RE) 101 and a working electrode (also: WE) 102 can be immersed in a fluid sample concerning the analyte (a particular type of ion). Working electrode 102 can be made selectively sensitive to the analyte ion by coating the electrode with or by manufacturing the electrode to comprise a suitable ion-sensitive material (ISM) 103.

Reference electrode 101 can be biased to a reference potential $V_R$ by bias circuit 104, and a voltage or change thereof in electrochemical cell 105 may be measured through a buffer amplifier 106, resulting in $V_{out}$. The voltage between reference electrode 101 and working electrode 102 may be a monotonic function of the analyte ion concentration. Optionally, a change in the voltage may be proportional to the logarithm of the analyte ion concentration. This function can be expressed by the so-called "Nernst equation".

FIG. 2A shows the symbolic representation of a three-electrode electrochemical cell for carrying out Galvanometric measurements. A reference electrode 211, a working electrode 212 and a counter-electrode (also: CE) 213 can be immersed in the fluid sample concerning the analyte. Working electrode 212 is made selectively sensitive to the analyte by proper choice of electrode material and/or by covering the electrode with a coating, such that the desired redox reaction is occurring on working electrode 212. The electronic circuit for carrying out a galvanometric measurement is shown schematically in FIG. 2B. Reference electrode 211 may be biased to a reference potential $V_R$ with a bias circuit 214 to generate a current I1 flowing from counter electrode 213 to working electrode 212 due to the redox reaction in electrochemical cell 215. A current I1 generated responsive to biasing reference electrode 211 to reference potential $V_R$ can be measured by measuring the voltage across a resistor R through buffer amplifier 216, resulting in $V_{out}$. In this way, a current of interest I2 can be expressed by the equation I2=$V_{out}$/R. This current of interest is a monotonic function of the analyte concentration consumed in the redox reaction. Optionally, the current of interest I2 is a linear function of the analyte concentration.

Figure 3:
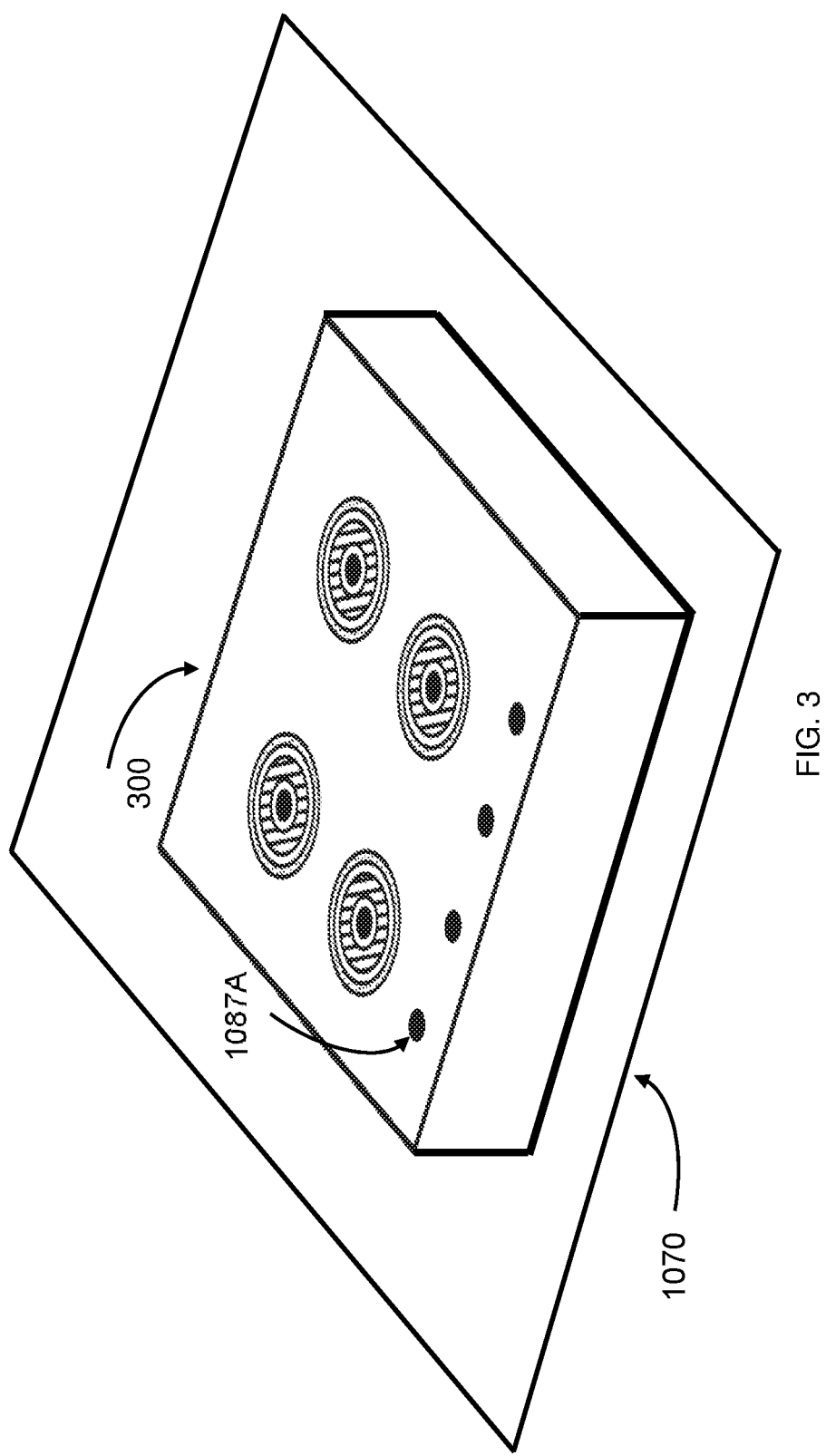
FIG. 3 is a schematic three-dimensional (3D) view illustration of a single-chip multi-channel transducer according to some embodiments.

Reference is made to FIG. 3, schematically illustrating a schematic three-dimensional (3D) view illustration of a single-chip multi-channel electrochemical analysis (also: MTIC) transducer 300. MTIC transducer 300 may comprise an electrode arrangement of, e.g., potentiostats and/or galvanostats, which may be implemented on the surface of the substrate of MTIC transducer 300. The electrode arrangement may be provided. The chip incorporating MTIC transducer 300 may further comprise analog and digital signal processing electronics that are operably coupled with the electrode arrangement implementing, for example, the potentiostats and/or galvanostats. Optionally, the signal processing electronics may be formed within and/or on the bulk of the substrate of MTIC transducer 300 and configured to output, e.g., signals encoding data descriptive of, for example, values of electrochemical properties of one or more chemical target analytes. In some examples, the signal processing electronics may be integrally formed with the bulk of the (semi-conductor) substrate.

The electrodes of MTIC transducer 300 are made sensitive and selective to the desired analyte targets. Conducting material of the electrodes may be connected to the input of one or more electronic circuits, implementing respectively a potentiostat and/or a galvanostat, for example, as illustrated in FIGS. 1B and 2B. The length of a conductive link between electrode terminals and an input to one or more respective electronic circuits (not shown in FIGS. 1B and 2B) may be below a few micrometers. For example, a distance between an electrochemical cell and its operably associated (e.g., analog) signal processing electronics may range from 0.1 microns to 10 mm. A reduction in the distance from a few centimeters to, for example, 100 micrometers or less, reduces or may even eliminate stray signal pickup and/or the generation of leakage current.

Figure 4:
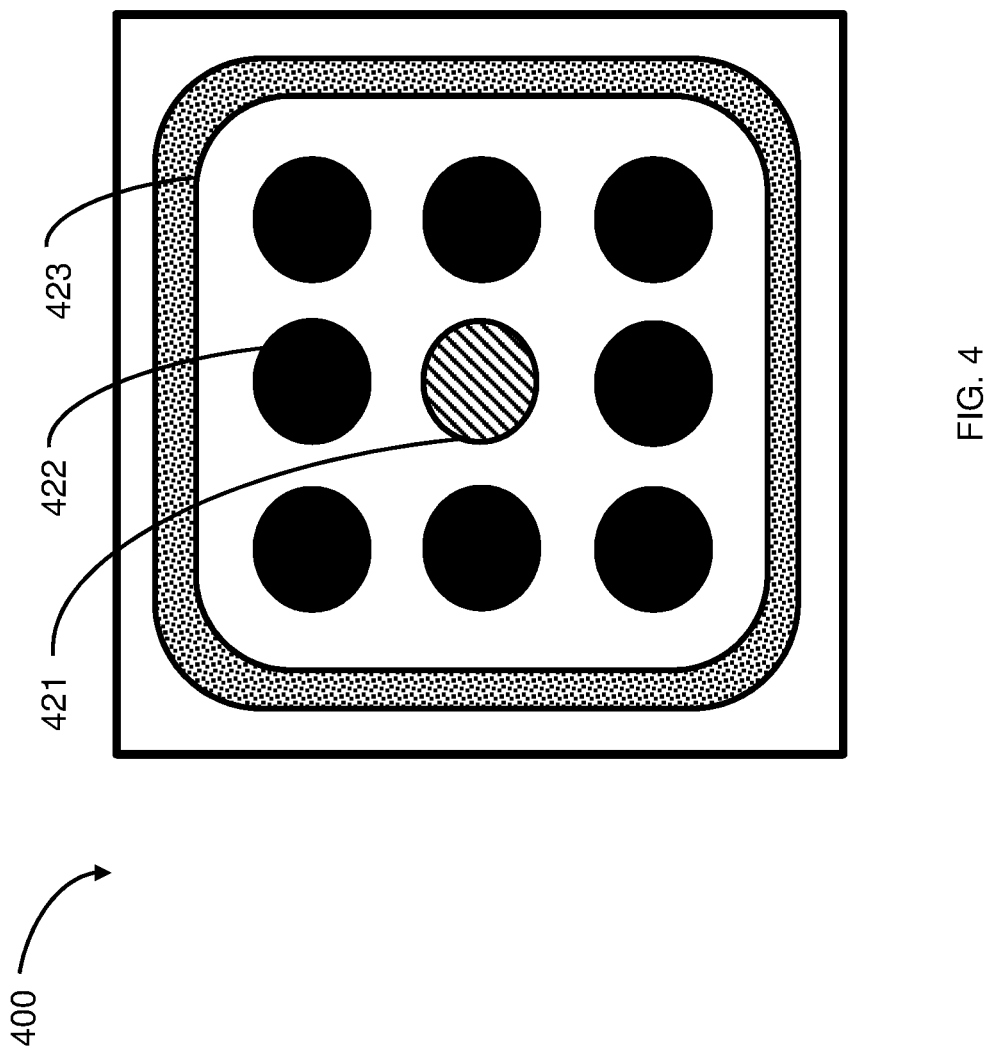
FIG. 4 is a schematic top-view illustration of a single-chip multi-channel potentiostat, according to some embodiments.

Further reference is made to FIG. 4. MTIC transducer 400 comprises, in some embodiments, a reference electrode 421 that may be common to all working electrodes 422 of MTIC transducer 400. The electrode array comprising reference electrode 421 and working electrodes 422 may be electrostatically shielded with a shield electrode 423. Shield electrode 423 may be held at a constant potential, so that the measurement conditions for reference electrode 421 and working electrodes 422 is stable (also: substantially stable) and independent of voltage or current sources nearby MTIC transducer 400.

Optionally, reference electrode 421 may be surrounded by working electrodes 422. The terminals of reference electrode 421 and working electrodes 422 may be coated with or comprise suitable ion-sensitive material. Optionally, shield electrode 423 may surround or encompass reference electrode and working electrodes 422 and further be configured to electrically shield the reference and working electrodes.

Figure 5:
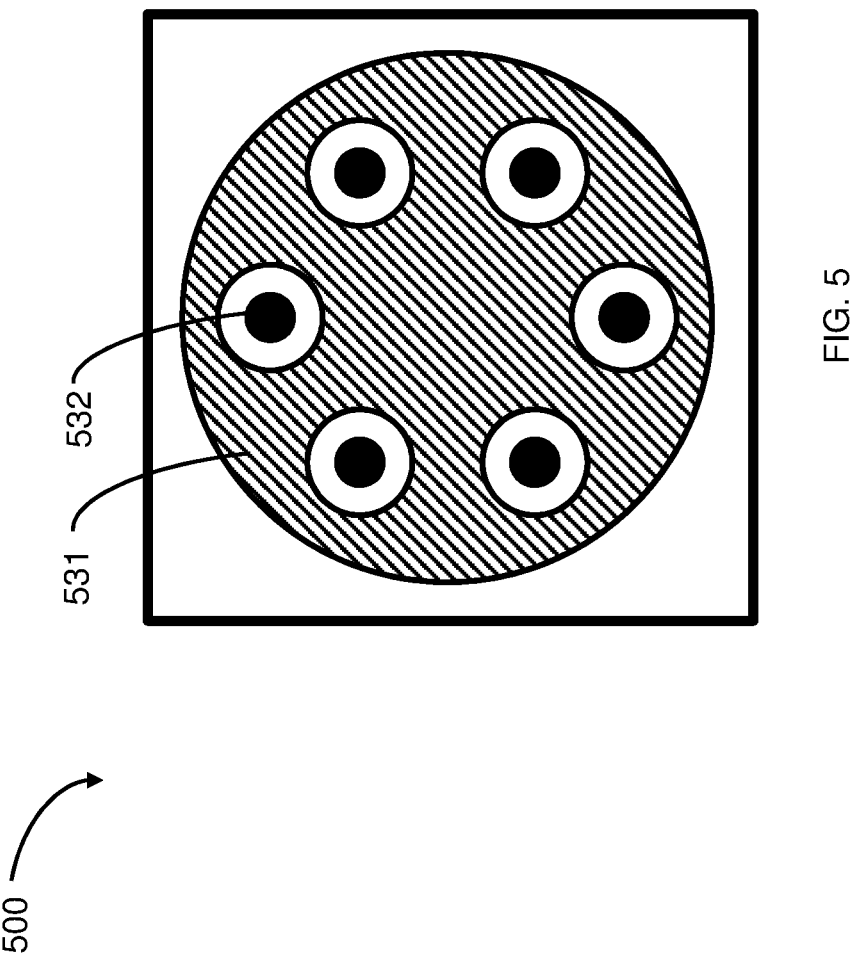
FIG. 5 is a schematic top-view illustration of a single-chip multi-channel potentiostat, according to some other embodiments.

Additional reference is made to FIG. 5. MTIC transducer 500 comprises, according to some embodiments, a reference electrode 531 which may optionally surround working electrodes 532 (or vice versa) either partially or completely.

In this way, comparatively stable electrostatic measurement conditions may be created without the need of an additional shield electrode. Conditions may be considered to be "stable" if a margin of error of analyte concentration measurements is, for example, 10% or less; 5% or less; or 1% or less. In potentiostat applications for instance, a margin of error may, alternatively, be expressed as an absolute value and required to be below, for example, 3 mV, or below 1 mV.

Reference electrode 531 may be implemented as a large area of conducting material, within which a plurality of working electrodes 532 are provided. Reference electrode 531 and working electrodes 532 may each be coated with or comprise suitable ion-sensitive material.

Figure 6:
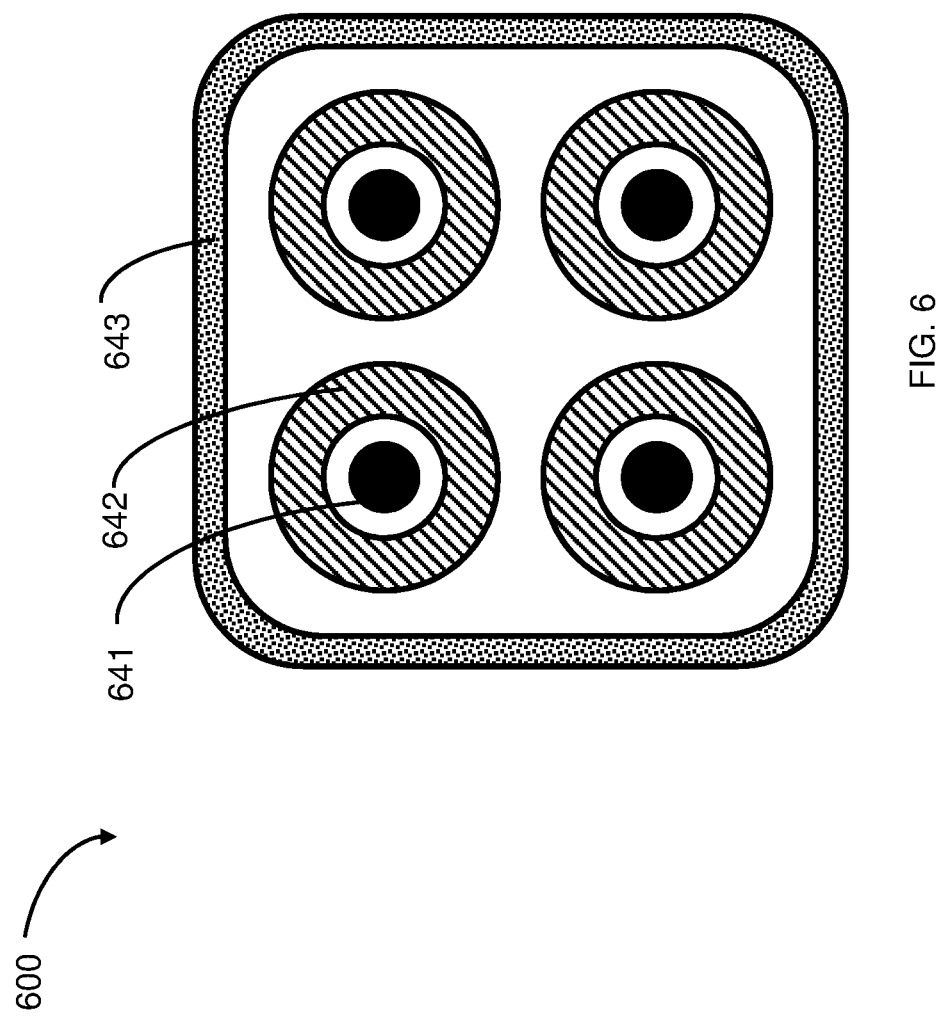
FIG. 6 is a schematic top-view illustration of a single-chip multi-channel galvanostat, according to some embodiments.

Further referring to FIG. 6. An MTIC transducer 600 comprises, in some embodiments, a plurality of galvanostat channels. Each galvanostat channel may be implemented by a working electrode 641 that may optionally be surrounded by a reference electrodes 642. A common counter-electrode 643 may optionally surround the plurality of galvanostat channels formed by the electrode arrays, such that comparatively stable electrostatic measurement conditions may be created. Working electrodes 641 may be coated with or comprise a suitable chemical material to potentially effect a desired redox reaction in the target analyte.

In some embodiments, at least two of a plurality of working electrodes of an MTIC transducer (e.g., at least two of the plurality of working electrodes 641) may be coated with or comprise different material (e.g., gold, silver or platinum).

Figure 7:
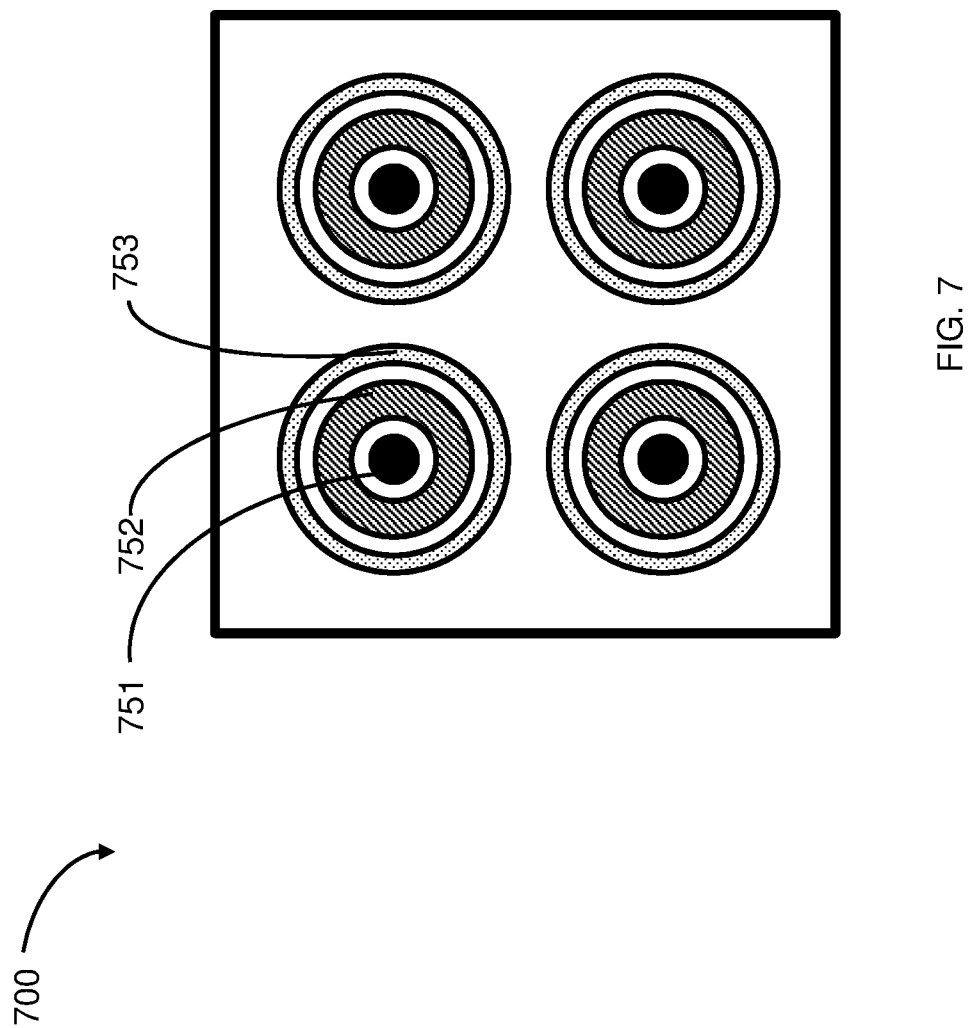
FIG. 7 is a schematic top-view of an alternative embodiment of a single-chip multi-channel galvanostat, according to some embodiments.

Additional reference is made to FIG. 7. MTIC transducer 700 comprises a plurality of galvanostats channels. Each galvanostat channel may be implemented by an arrangement of working, reference and counter-electrodes 862, 752 and 753. Optionally, working electrode 751 may be surrounded by reference electrode 752, which may optionally be surrounded by counter-electrode 753. Working electrodes 751 may be coated with suitable chemical coating that can effect a redox reaction.

The channels of any of the above potentiostat and galvanostat channels of the MTIC transducers exemplified herein may be chemically and electrically independent from each other, i.e., each channel may be configured to provide an output pertaining to a different analyte, it may be possible to realize any number and any combination of potentiostat and galvanostat channels on a single chip.

Figure 8:
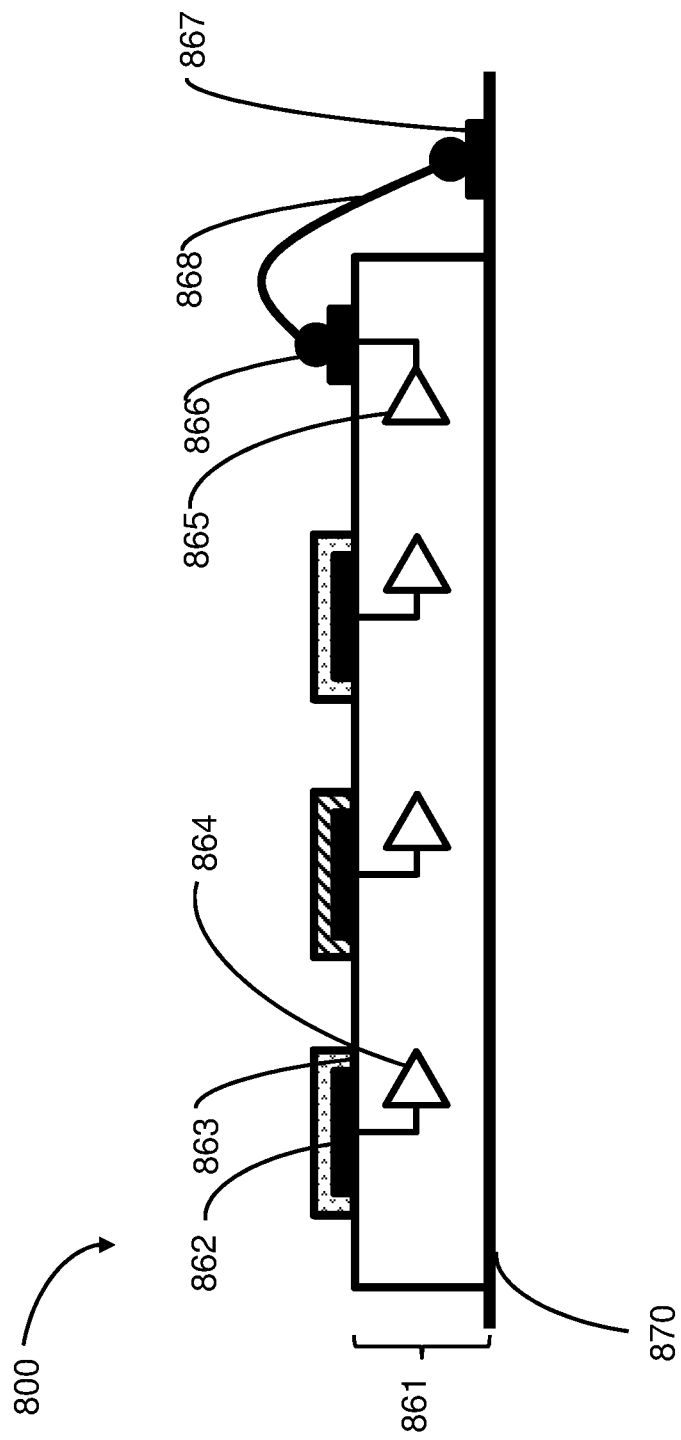
FIG. 8 is a schematic cross-sectional view of a single-chip multi-channel transducer, according to some embodiments.
Figure 9:
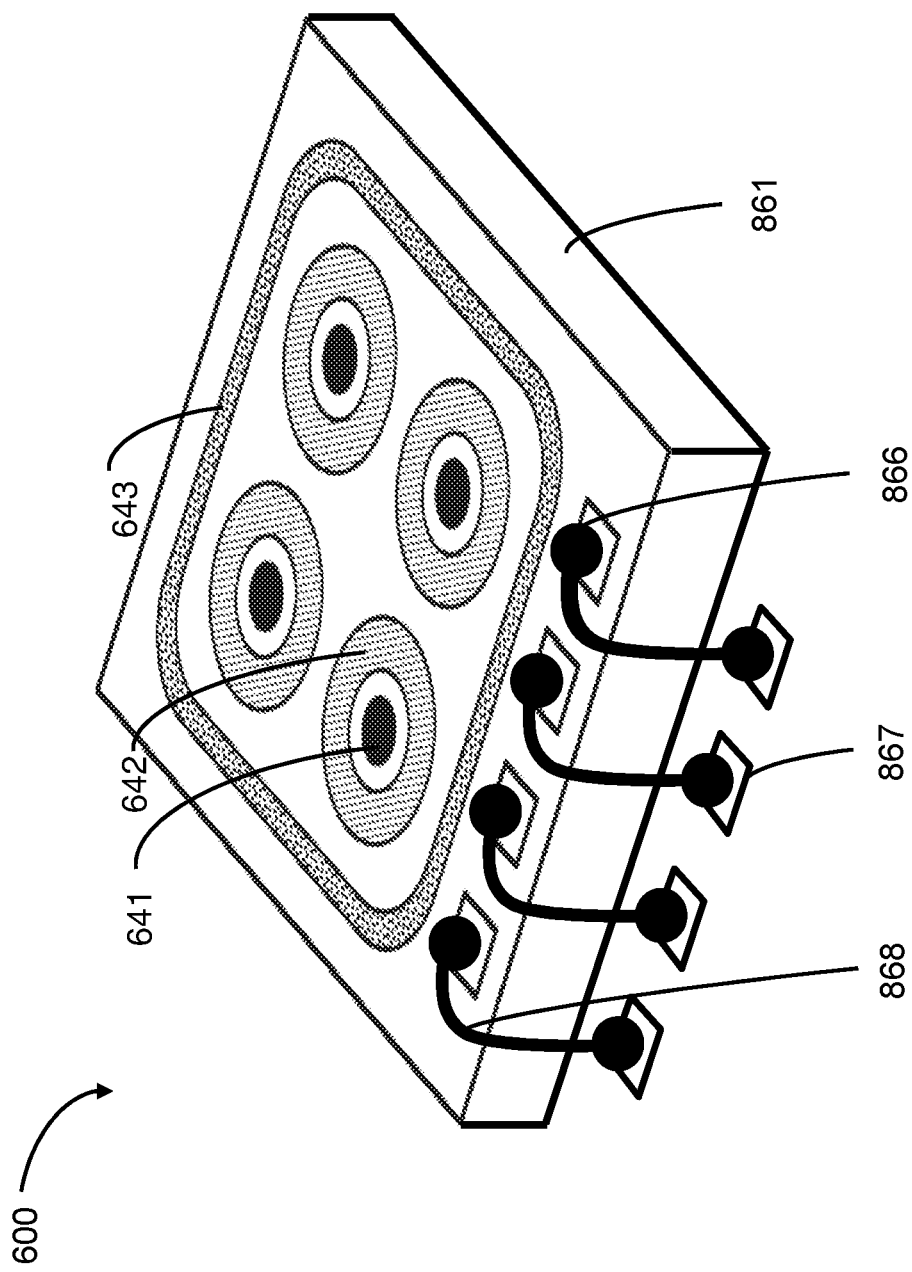
FIG. 9 is a schematic 3D view illustration of a single-chip multi-channel transducer, according to some embodiments.

Additional reference is made to FIGS. 8 and 9. As remarked above, by employing comparatively short-distance signal lines connecting between the terminal(s) of the measurement electrode and the input to the electronic signal processing circuits, the electronic signals transmitted by the signal lines may be less susceptible to external influence, and the signal quality may be improved. For example, Signal-to-noise ratio (SNR) may increase.

The chip implementing MTIC transducer 800 illustrated in FIG. 8 and which comprises a substrate 861 having an upper and a lower surface. Various electrode structures that comprise electrically conducting materials may be provided on the upper surface of substrate 861 using various manufacturing techniques including, for example, CMOS technology.

Since post-processing of these chips can occur in ambient atmosphere, it may be desirable that the electrode materials do not form isolating oxide layers (so-called native oxides) under ambient conditions. Electrodes may thus be made of inert metals such as, for example, gold, tungsten or vanadium, or highly conducting non-oxidizing semiconductors such as TiN.

The different electrodes may be (post-)processed by individual functionalization using appropriate electrochemically responsive material layers 863 deposited on electrodes 862. Electrodes 862 are electrically coupled with the high-impedance inputs of one or more electronic signal processing circuits 864 of MTIC transducer 800 to generate a desired electronic signal as a function of the concentration of the corresponding analyte.

According to some embodiments, electrodes may be processed to include chemical sensitization layers so that each electrode with its corresponding layer responsively outputs different electrical parameter values as a result of being subjected to a corresponding change in an environmental condition. Such environmental condition can pertain, for example, a local magnetic field, illumination in various spectral ranges (i.e. various "colors" of the light incident onto the electrodes), temperature, heat flux, humidity, gas/fluid flux, and/or the like.

The term "light" should not be construed as being limited to visible light and may additionally or alternatively include non-visible radiation Moreover, the terms "light" and "electromagnetic radiation" may herein be used interchangeably. Optionally, MTIC transducer 800 may be employed to detect and/or measure a change in color of the sensing site (e.g., a human skin region).

Electronic signal processing circuits 864 may be arranged in proximity to electrodes 862. Optionally, signal processing circuits 864 may be embedded within substrate 861, e.g., between the upper and the lower surface of substrate 861, e.g., at a distance which is less than 5 microns, for example, in the range of a few hundred nanometers. Optionally, electronic signal processing circuits 864 may be provided on the upper surface of substrate 861.

Electronic signal processing circuits 864 may generate low-impedance electrical output signals that are input to a driver module for external readout therefrom.

As schematically illustrated in FIG. 8, the driver module may comprise an on-chip driver terminal 865 and driver wiring (also: wire bonding) 868 for the transfer of signals received by on-chip driver terminal 865 from on-chip driver terminal (e.g., bonding pads) 866 to an off-chip (also: external) driver terminal (also: off-chip bonding pads) 867 for signal readout therefrom. Off-chip driver terminal 867 may for example be provided on a printed circuit board (PCB) 870.

Optionally, bonding pads 866 may be provided on the upper surface of substrate 861. Off-chip bonding pads 867 may be provided on the substrate's surface and respectively coupled with on-chip pads 866 through wire bonding 868.

The configuration of MTIC transducer 800 may provide comparatively reliable electrical connections for signal readout and, optionally, for further processing thereof.

Figure 10:
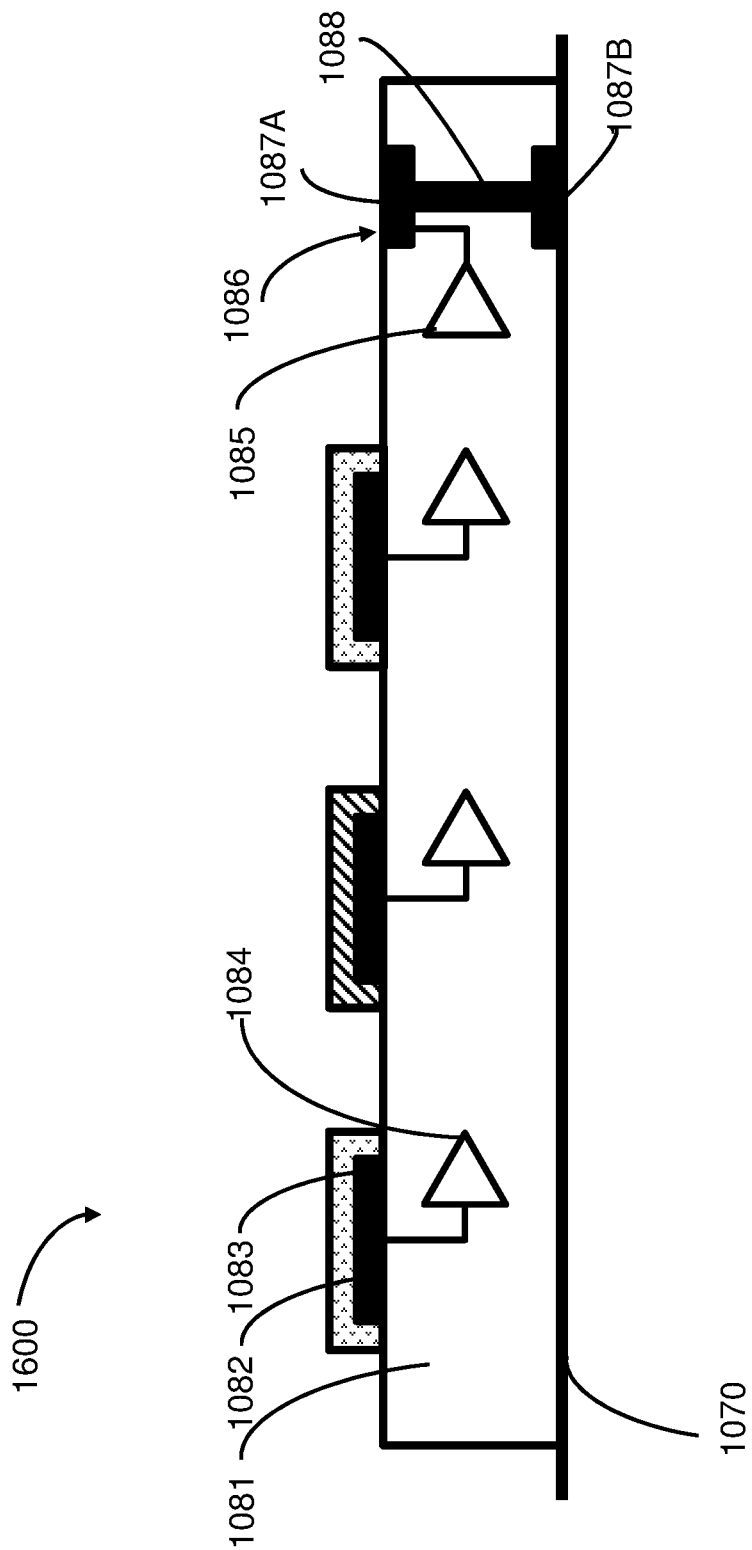
FIG. 10 is a schematic cross-sectional view of a single-chip multi-channel transducer, according to some embodiments.

As can readily be seen from FIGS. 8 and 9, surface planarity of MTIC transducer 600 may depend on the elevation of wire bonding 868 and of electrodes above the substrate, and the electrode coating thickness. Planarity may be comparatively improved, for example, by providing an MTIC transducer 1600 having a configuration as exemplified in FIG. 10.

MTIC transducer 1600 comprises a substrate 1081 on which there are provided various electrode terminals 1082 coated with an electrochemically responsive material layer 1083. Electrode terminals 1082 may for example comprise inert metals such as, for example, gold, tungsten or vanadium, or highly conducting non-oxidizing semiconductors such as, for example, TiN. The electrodes may be selectively functionalized, for example, by coating thereof with appropriate electrochemical material layers 863.

Electrodes terminals 1082 are electrically connected to the high-impedance inputs of one or more signal processing electronic circuits 1084, which are, in some embodiments, embedded within substrate 1081.

Electronic circuits 1084 are configured to generate low-impedance electrical output signals that are input to a signal line of a line driver 1085. The signal line may be operably connected with a top metallic structure 1087A and/or a bottom metallic structure 1087B via a metallic plug material 1088. The top metallic structure 1087A allows signal readout from the upper surface of substrate 1081, and the bottom metallic structure 1087B allows signal readout from the lower surface of substrate 1081.

Optionally, Through-Silicon Vias (TSVs) may be employed so that top metallic structures 1086 are electrically connected to top or bottom metallic structures 1087 through metallic plug material 1088 that traverses substrate 1081 entirely. In this way, metallic structures 1087 can be employed as bonding pads for electrically coupling electronic circuits 1084 with, for example, PCB 1070. The corresponding perspective view of such a single-chip multi-channel electrochemical transducer with TSV is schematically shown in FIG. 3.

Figure 11:
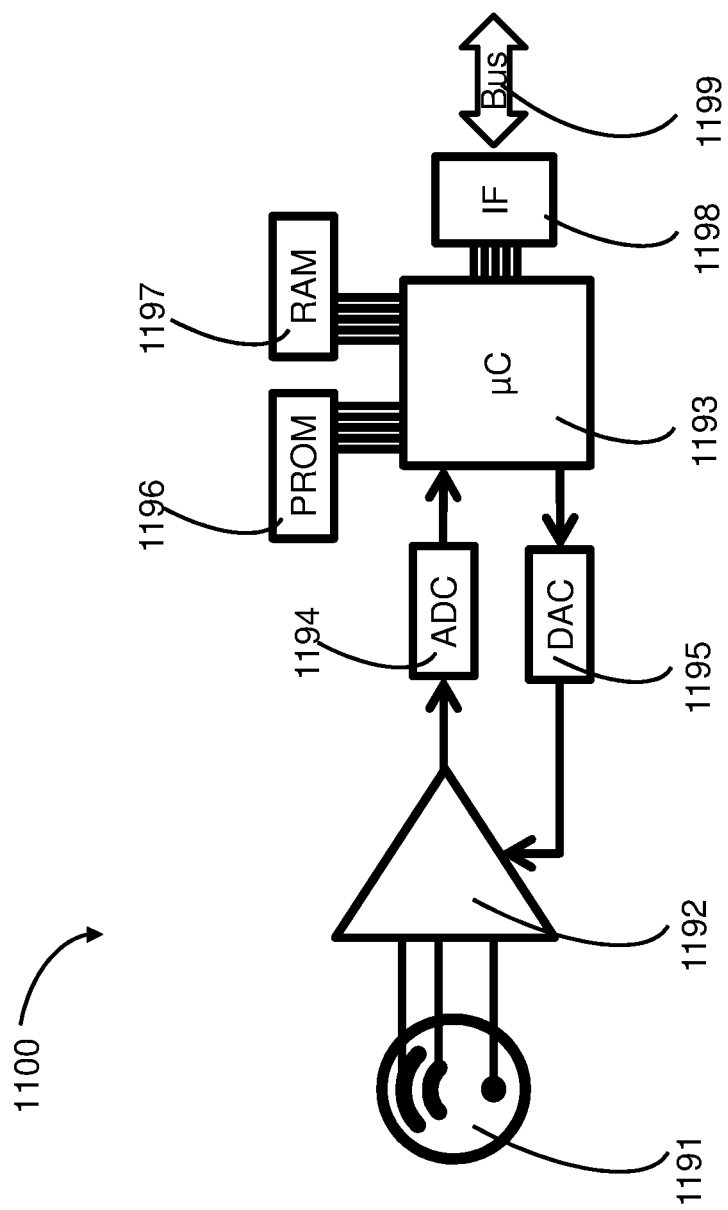
FIG. 11 is a schematic illustration of a multi-channel transducer and analysis system, according to some embodiments.

Additional reference is made to FIG. 11. A multi-channel electrochemical transducer and analysis (MTA) system 1100 may comprise an MTIC transducer and additional components for processing transducer output, all of which may be incorporated in a monolithic chip arrangement. MTA system 1100 may comprise an electrochemical cell 1191 and signal processing electronics 1192 coupled thereto for signal readout of a multitude of input channels.

Electrochemical cell 1191 is operable to sense a physical stimulus or to transduce signals pertaining to a property of a fluid that is in contact with the electrodes of the cell. Electrochemical cell 1191 can be, for example, a potentiostat or a galvanostat cell. In the case of a potentiostat, a voltage signal may be measured by signal processing electronics 1192. In the case of a galvanostat, a current signal is measured by signal processing electronics 1192.

Analog signals may be output by signal processing electronics 1192 and may be processed by an analog-to-digital converter (ADC) 1194 to provide output signals encoding data in a digital manner for further processing by a microcontroller 1193. The operation of ADC converter 1194 may be controlled by microcontroller 1193.

MTA system 1100 may further comprise a Digital-to-Analog Converter (DAC) 1195. DAC 1195 may be employed to convert digital signals provided by microcontroller 1193 into analog signals including, e.g., voltage signals. Analog signals output by DAC 1195 may for example be employed to bias reference electrode of electrochemical cells 1191 to the appropriate reference voltages $V_R$, as illustrated in the schematic circuits shown in FIGS. 1B and 2B.

Microcontroller 1193 may be operably coupled with one or more memory units such as, for example, a Programmable Read-Only Memory (PROM) 1196 and a Random Access Memory (RAM) 1197. PROM 1196 may be employed to store data permanently, e.g., during electrode functionalization, calibration and/or operation of one of the MTIC transducers exemplified herein.

In a functionalization procedure, relevant production data can be stored, such as serial number, fabrication date, fabrication site, ID of plant manager, fabrication conditions along with respective time stamps (temperature, humidity, atmospheric composition, pressure, etc.), and/or arrangement of electrochemical cells.

In a calibration procedure, at least a portion of the MTIC transducers may be immersed in a fluid sample comprising analytes with known concentrations, and the response of the electrochemical cell is measured. These calibration results can be stored in PROM 1196, for later use in the calculation of calibration-corrected output data.

Moreover, operational data can be stored in PROM 1196, such as the date and time when an MTIC transducer is first used for a measurement, when it is powered down for extended periods, which minimum and maximum analyte concentrations were measured, gather information pertaining to the reproducibility of outputs provided by MTA system, etc. Gathering and analyzing operation data may for example allow deriving information about the expiry date of the MTIC transducers, about operational stress of the electrochemical cells and reliability of the electrochemical measurements.

PROM 1196 may store instructions which, when executed by microcontroller 1193, may result in applications pertaining to MTIC transducers. Such applications can include, for example, calibration procedures. Optionally, RAM 1197 may be employed for storing intermediate results and making calculations. As an example, using stored calibration data in PROM 1196, microcontroller 1193 can make extended calculations with the aid of RAM 1197 by executing calibration instruction stored in PROM 1196 resulting in the calibration application. In this way, the output data provided may always be calibrated.

In some embodiments, the application(s) may herein be referred to as "MTIC module". A module may be a self-contained hardware and/or software component that interfaces with a larger system. A module may comprise a machine or machines executable instructions. A module may be embodied by a circuit or a controller programmed to cause the system to implement the method, process and/or operation as disclosed herein. For example, a module may be implemented as a hardware circuit comprising, e.g., custom VLSI circuits or gate arrays, an Application-specific integrated circuit (ASIC), off-the-shelf semiconductors such as logic chips, transistors, and/or other discrete components. A module may also be implemented in programmable hardware devices such as field programmable gate arrays, programmable array logic, programmable logic devices and/or the like.

Microcontroller 1193 can communicate with the outside world through an interface 1198 for transmitting and receiving data to an external device (not shown).

The external device may include a multifunction mobile communication device also known as "smartphone", a personal computer, a laptop computer, a tablet computer, a server (which may relate to one or more servers or storage systems and/or services associated with a business or corporate entity, including for example, a file hosting service, cloud storage service, online file storage provider, peer-to-peer file storage or hosting service and/or a cyberlocker), personal digital assistant, a workstation, a wearable device, a handheld computer, a notebook computer, a vehicular device, a stationary device and/or a home appliances control system.

Interface 1198 may be optionally be operably coupled with an (e.g., bidirectional) bus 1199. As an example, a receiving node of bus 1199 could output a command to obtain the measurement data of a specific channel. Microcontroller 1193 may then carry out this measurement, convert the result into a digital value, carry out calibration procedures if necessary, and provide the measurement data to the receiving node on the bus 1199 for readout. Optionally, bus 1199 may be implemented as a bidirectional digital bus employing a four-line i2C bus or a four-line USB bus.

In some embodiments, one or more components of MTA system 1100 may comprise or be operably coupled with a power supply. For example, electrical power can be provided over bus 1199. Since bus 1199 contains comparatively low-impedance signals, the distance between the bus and a power source can be several meters long Width of bus 1199 can be independent of the number of electrochemical measurement channels in the MTIC transducers. A large number of parallel channels, exceeding several tens of channels, can be implemented while still controlling the electrochemical analysis system over the same bus 1199 using, for example, time-division-multiplexing (TDM).

It will be appreciated that separate processors and/or controllers can be allocated for each element or processing function in an MTA system. However, for simplicity, the description may herein refer to microcontroller 1193 as a generic processor which conducts all the necessary processing functions of an MTA system. Accordingly, in some embodiments, all or most of the signal processing for analyzing the fluid sample may be performed locally, i.e., on-site, without requiring wireless transmission of signals to the external device for performing analysis of the fluid sample. In some embodiments, processing of the signals for analysis of the fluid sample and display of related information may be performed by the external device.

Figure 12:
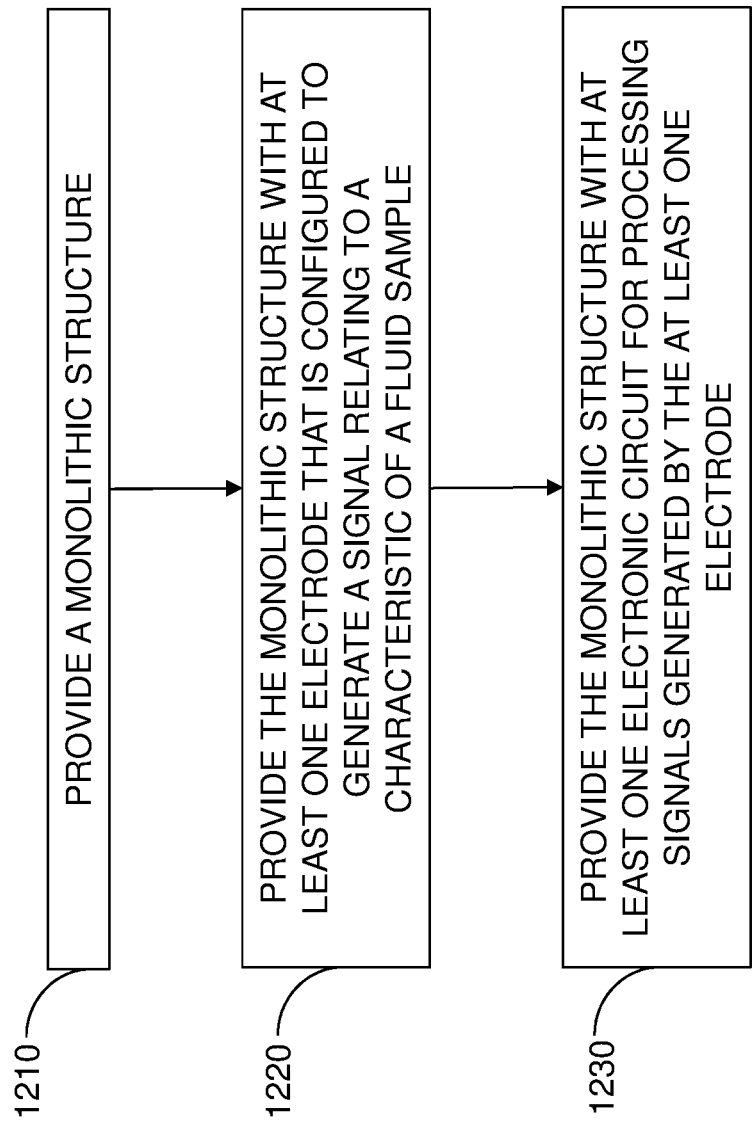
FIG. 12 is a flow chart illustration of a method for manufacturing a single-chip multi-channel transducer, according to some embodiments.

Further reference is made to FIG. 12. As indicated by block 1210, a method for manufacturing an MTIC transducer includes, in an embodiment, providing a monolithic structure. As indicated by block 1220, the method further includes, in an embodiment, providing the monolithic structure with at least one electrode that is configured to generate a signal relating to a characteristic of a fluid sample. As indicated by block 1230, the method includes, in an embodiment, providing the monolithic structure with at least one electronic circuit for processing signals generated by the at least one electrode.

ADDITIONAL EXAMPLES

Example 1 includes a monolithic arrangement comprising at least one electrochemically responsive electrode that is configured to generate a signal relating to a characteristic of a fluid sample; and at least one electronic circuit for processing signals generated by the at least one electrode.

Example 2 includes the subject matter of example 1 and, optionally, wherein the at least one electronic circuit comprises the at least one electrode.

Example 3 includes the subject matter of examples 1 or 2 and, optionally, wherein the monolithic arrangement further comprises a plurality of electrodes.

Example 4 includes the subject matter of example 3 and, optionally, wherein the plurality of electrodes is configured to allow implementing potentiostat and/or galvanostat measurement techniques.

Example 5 includes the subject matter of examples 3 or 4 and, optionally, wherein at least two of the plurality of electrodes have different electrochemical material layers to obtain correspondingly different electrode functionalization.

Example 6 includes the subject matter of any one of the examples 1 to 5 and, optionally, wherein the at last one electronic circuit performs A/D conversion of analog signals carried by conductive links of the electrodes to provide digital output signals relating to characteristics of the fluid sample.

Example 7 includes the subject matter of example 6 and, optionally, wherein the at least one electronic circuit amplifies the digital output signals.

Example 8 includes the subject matter of examples 6 or 7 and, optionally, wherein a given digital output can carry data relating to analog signals of at least two electrodes.

Example 9 includes the subject matter of any one of the examples 1 to 8 and, optionally, wherein the at least one electronic circuit implements an analysis module that is operable to analyze signals generated by the at least one electrode and output, based on the performed analysis, information relating to the sample.

Example 10 includes an electrochemical transducer comprising at least one electrochemically responsive electrode that is configured to generate a signal relating to a characteristic of a fluid sample; and at least one electronic circuit for processing signals generated by the at least one electrode, wherein the at least one electrochemically responsive electrode and electronic circuit are incorporated in a monolithic chip structure.

Example 11 includes the subject matter of example 10 and, optionally, wherein the at least one electronic circuit comprises the at least one electrode.

Example 12 includes the subject matter of examples 10 or 11, wherein electrochemical transducer comprises a plurality of electrodes.

Example 13 includes the subject matter of example 12 and, optionally, wherein the plurality of electrodes is configured to implement potentiostat and/or galvanostat measurement techniques.

Example 14 includes the subject matter of example 13 and, optionally, wherein at least two of the plurality of electrodes have different electrochemical material layers to obtain correspondingly different electrode functionalization.

Example 15 includes a method for manufacturing an electrochemical transducer, the method comprising: providing a monolithic structure; providing the monolithic structure with at least one electrode that is configured to generate a signal relating to a characteristic of a fluid sample; and providing the monolithic structure with at least one electronic circuit for processing signals generated by the at least one electrode.

Example 16 includes use of the monolithic arrangement of any one of the examples 1 to 9 and/or use of a transducer of any one of the examples 10 to 14.

Example 17 includes a method for measuring a characteristic of a fluid sample, comprising: providing a monolithic arrangement of any one of the examples 1 to 9 and comprising an electrochemical transducer; and subjecting the electrochemical transducer to a fluid sample.

Example 18 includes a method for measuring one or more parameter values pertaining to one or more fluid samples, comprising: operably engaging a monolithic arrangement that comprises one or more electrochemically responsive electrodes with organ tissue of a user; and processing signals that are generated by the one or more electrochemically responsive electrodes in response to making contact with bodily fluid discharged by the organ tissue.

Any digital computer system, module and/or engine exemplified herein can be configured or otherwise programmed to implement a method disclosed herein, and to the extent that the system, module and/or engine is configured to implement such a method, it is within the scope and spirit of the disclosure. Once the system, module and/or engine are programmed to perform particular functions pursuant to computer readable and executable instructions from program software that implements a method disclosed herein, it in effect becomes a special purpose computer particular to embodiments of the method disclosed herein. The methods and/or processes disclosed herein may be implemented as a computer program product that may be tangibly embodied in an information carrier including, for example, in a non-transitory tangible computer-readable and/or non-transitory tangible machine-readable storage device. The computer program product may directly loadable into an internal memory of a digital computer, comprising software code portions for performing the methods and/or processes as disclosed herein.

Additionally or alternatively, the methods and/or processes disclosed herein may be implemented as a computer program that may be intangibly embodied by a computer readable signal medium. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a non-transitory computer or machine-readable storage device and that can communicate, propagate, or transport a program for use by or in connection with apparatuses, systems, platforms, methods, operations and/or processes discussed herein.

The terms "non-transitory computer-readable storage device" and "non-transitory machine-readable storage device" encompasses distribution media, intermediate storage media, execution memory of a computer, and any other medium or device capable of storing for later reading by a computer program implementing embodiments of a method disclosed herein. A computer program product can be deployed to be executed on one computer or on multiple computers at one site or distributed across multiple sites and interconnected by one or more communication networks.

These computer readable and executable instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified herein. These computer readable and executable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable and executable instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

In the discussion, unless otherwise stated, adjectives such as "substantially" and "about" that modify a condition or relationship characteristic of a feature or features of an embodiment of the invention, are to be understood to mean that the condition or characteristic is defined to within tolerances that are acceptable for operation of the embodiment for an application for which it is intended.

"Coupled with" means indirectly or directly "coupled with".

It is important to note that the method may include is not limited to those diagrams or to the corresponding descriptions. For example, the method may include additional or even fewer processes or operations in comparison to what is described in the figures. In addition, embodiments of the method are not necessarily limited to the chronological order as illustrated and described herein.

Discussions herein utilizing terms such as, for example, "processing", "computing", "calculating", "determining", "establishing", "analyzing", "checking", "estimating", "deriving", "selecting", "inferring" or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

It should be understood that where the claims or specification refer to "a" or "an" element and/or feature, such reference is not to be construed as there being only one of that element. Hence, reference to "an element" or "at least one element" for instance may also encompass "one or more elements".

Terms used in the singular shall also include the plural, except where expressly otherwise stated or where the context otherwise requires.

In the description and claims of the present application, each of the verbs, "comprise" "include" and "have", and conjugates thereof, are used to indicate that the object or objects of the verb are not necessarily a complete listing of components, elements or parts of the subject or subjects of the verb.

Unless otherwise stated, the use of the expression "and/or" between the last two members of a list of options for selection indicates that a selection of one or more of the listed options is appropriate and may be made, and may be used interchangeably with the expressions "at least one of the following", "any one of the following" or "one or more of the following", followed by the list of options.

It is appreciated that certain features of the invention, which are, for clarity, described in the context of separate embodiments or example, may also be provided in combination in a single embodiment. Conversely, various features of the invention, which are, for brevity, described in the context of a single embodiment, example and/or option, may also be provided separately or in any suitable sub-combination or as suitable in any other described embodiment, example or option of the invention. Certain features described in the context of various embodiments, examples and/or optional implementation are not to be considered essential features of those embodiments, unless the embodiment, example and/or optional implementation is inoperative without those elements.

The number of elements shown in the Figures should by no means be construed as limiting and is for illustrative purposes only.

Positional terms such as "upper", "lower" "right", "left", "bottom", "below", "lowered", "low", "top", "above", "elevated", "high", "vertical" and "horizontal" as well as grammatical variations thereof as may be used herein do not necessarily indicate that, for example, a "bottom" component is below a "top" component, or that a component that is "below" is indeed "below" another component or that a component that is "above" is indeed "above" another component as such directions, components or both may be flipped, rotated, moved in space, placed in a diagonal orientation or position, placed horizontally or vertically, or similarly modified. Accordingly, it will be appreciated that the terms "bottom", "below", "top" and "above" may be used herein for exemplary purposes only, to illustrate the relative positioning or placement of certain components, to indicate a first and a second component or to do both.

As used herein, if a machine (e.g., a processor) is described as "configured to" "operable to" or "operative to" perform a task (e.g., configured to cause application of a predetermined field pattern), then, at least in some embodiments, the machine may include components, parts, or aspects (e.g., software) that enable the machine to perform a particular task. In some embodiments, the machine may perform this task during operation. Similarly, when a task is described as being done "in order to" establish a target result, then, at least in some embodiments, carrying out the task may accomplish the target result.

It is noted that the terms "operable to" can encompass the meaning of the term "adapted or configured to". In other words, a machine "operable to" perform a task can in some embodiments, embrace a mere capability (e.g., "adapted") to perform the function and, in some other embodiments, a machine that is actually made (e.g., "configured") to perform the function.

Throughout this application, various embodiments may be presented in and/or relate to a range format. It should be understood that the description in range format is merely for convenience and brevity and should not be construed as an inflexible limitation on the scope of the embodiments. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Where applicable, whenever a numerical range is indicated herein, it is meant to include any cited numeral (fractional or integral) within the indicated range.

The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals there between.

While the invention has been described with respect to a limited number of embodiments, these should not be construed as limitations on the scope of the invention, but rather as exemplifications of some of the embodiments.

What is claimed is:

1. A multi-channel transducer and analysis system, comprising:
   a multi-channel integrated-circuit or IC-based electrochemical (MTIC) transducer;
   the MTIC transducer comprising:
   a plurality of electrochemically responsive electrodes operable to generate signals relating to a characteristic of a fluid sample;
   at least one electronic circuit for processing signals generated by the plurality of electrodes; and
   on-chip memory for storing data relating to the signals generated by the plurality of electrodes, wherein the plurality of electrodes, the at least one electronic circuit and the on-chip memory are all incorporated in the same monolithic arrangement,
   wherein the at least one electronic circuit is operable to process data relating to signals provided by the plurality of electrochemically responsive electrodes to derive, based on the processing of the data, an expiry date of the MTIC transducer.

2. The multi-channel transducer and analysis system of claim 1, wherein the at least one electronic circuit comprises an A/D processing circuit for converting received analog signals provided by the plurality of electrodes into digital signals for further processing.

3. The multi-channel transducer and analysis system of claim 1, wherein the on-chip memory stores data relating to calibration procedures, and wherein the least one electronic circuit is operable to process the signals provided by the plurality of electrodes to provide, based on the stored data, calibration-corrected output data.

4. The multi-channel transducer and analysis system of claim 1, wherein the on-chip memory further stores data descriptive of production of the system, a sensitizing electrode coating and/or measurements that were carried out with the plurality of electrodes and the at least one electronic circuit.

5. The multi-channel transducer and analysis system of claim 1, wherein data descriptive of the production includes a serial number, fabrication date, fabrication site, ID of plant manager, fabrication conditions along with respective time stamps, and/or descriptive of an arrangement of electrochemical cells.

6. The multi-channel transducer and analysis system of claim 1, wherein the on-chip memory stores operational data including: the date and time when an MTIC transducer is first used for a measurement, when it is powered down for extended periods, which minimum and maximum analyte concentrations were measured and/or to gather information pertaining to the reproducibility of outputs provided by the system to derive the expiry date of the MTIC transducer.

7. The multi-channel transducer and analysis system of claim 1, further comprising an analysis module that is operable to analyze signals generated by the plurality of electrochemically responsive electrodes and output, based on the performed analysis, information relating to the fluid sample.

8. The multi-channel transducer and analysis system of claim 1, operable to perform potentiostat and/or galvanostat measurement.

9. The multi-channel transducer and analysis system of claim 1, wherein the plurality of electrodes and the at least one electronic circuit are operable to perform measurement concentration of two or more analytes by sequentially subjecting the plurality of electrodes to at least two different voltages and/or voltage differences.

10. The multi-channel transducer and analysis system of claim 1, wherein the plurality of electrodes and the at least one electronic circuit are operable to perform electrical impedance spectroscopy (EIS).

11. The multi-channel transducer and analysis system of claim 1, wherein the plurality of electrodes and the at least one electronic circuit is operable to provide, over the same channel, different output modalities for obtaining data pertaining to different fluid solution properties.

12. The multi-channel transducer and analysis system of claim 11, wherein a first output modality determines the concentration of a first analyte, and a second output modality pertains to a second analyte; and/or at least two different output modalities may be employed for quantitative and for qualitative analysis.

13. The multi-channel transducer and analysis system of claim 1, comprising a working electrode that is selectively sensitive to an analyte by proper choice of electrode material and/or by covering the electrode with a coating, such that a desired redox reaction can occur on the working electrode.

14. The multi-channel transducer and analysis system of claim 13, wherein the at least two electrodes further comprise a reference electrode.

15. The multi-channel transducer and analysis system of claim 13, wherein the at least one electronic circuit implements a bias circuit for biasing a reference electrode.

16. The multi-channel transducer and analysis system of claim 15, further comprising a digital-to-analog converter for converting digital signals into analog signals for biasing, based on the analog signals, the reference electrode to the appropriate reference voltage.

17. The multi-channel transducer and analysis system of claim 1, wherein the plurality of electrochemically responsive electrodes comprise a shield electrode that surrounds at least two electrodes.

18. The multi-channel transducer and analysis system of claim 17, wherein the shield electrode is a reference electrode encompassing working electrodes, or wherein the shield electrode is a working electrode encompassing reference electrodes, either partially or completely.

19. A method for manufacturing a multi-channel transducer and analysis system, for realizing at least one MTIC transducer implemented as a monolithic structure, the method comprising:
   providing a monolithic structure;
   providing the monolithic structure with at least one electrode that is configured to generate a signal relating to a characteristic of a fluid sample;
   providing the monolithic structure with at least one electronic circuit for processing signals generated by the at least one electrode; and
   providing the monolithic structure with on-chip memory for storing data relating to signals generated by the at last one electrode,
wherein the at least one electronic circuit is operable to process data relating to signals produced by the at least one electrode to determine an expiry date of the MTIC transducer.

20. A method for measuring one or more parameter values pertaining to one or more fluid samples, the method comprising:
   operably engaging a monolithic arrangement, which comprises at least one MTIC transducer including one or more electrochemically responsive electrodes with organ tissue of a user; and
   processing signals that are generated by the at least one electrode in response to making contact with bodily fluid discharged by the organ tissue,
   wherein processing of the signals comprises analyzing data relating to the processed signals by an analysis module to determine an expiry date of the MTIC transducer.

* * * * *